(12) United States Patent
Jokipii (10) Patent No.: US 7,418,390 B1
(45) Date of Patent: Aug. 26, 2008

(54) MULTI-LANGUAGE SYSTEM FOR ONLINE COMMUNICATIONS

(75) Inventor: Eron A. Jokipii, San Mateo, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1464 days.

(21) Appl. No.: 09/717,822

(22) Filed: Nov. 20, 2000

(51) Int. Cl.
G10L 11/00 (2006.01)
G06F 17/28 (2006.01)
G06F 17/20 (2006.01)

(52) U.S. Cl. ............... 704/270.1; 704/2; 704/4; 704/8

(58) Field of Classification Search ............... 704/3–6, 704/7, 8; 707/536; 717/1, 4, 8
See application file for complete search history.

(56) References Cited

U.S. PATENT DOCUMENTS

| | | | |
|---|---|---|---|
| 5,907,326 A | | 5/1999 | Atkin et al. |
| 5,974,372 A | * | 10/1999 | Barnes et al. ............... 704/8 |
| 6,092,036 A | * | 7/2000 | Hamann ..................... 704/8 |
| 6,092,037 A | * | 7/2000 | Stone et al. ................ 704/8 |
| 6,389,386 B1 | * | 5/2002 | Hetherington et al. ...... 704/8 |
| 6,490,547 B1 | * | 12/2002 | Atkin et al. ................. 704/8 |
| 6,493,661 B1 | * | 12/2002 | White, III et al. .......... 704/8 |
| 6,496,793 B1 | * | 12/2002 | Veditz et al. ............... 704/8 |
| 6,901,361 B1 | * | 5/2005 | Portilla ..................... 704/8 |

FOREIGN PATENT DOCUMENTS

| | | |
|---|---|---|
| EP | 0 762 299 A1 | 3/1997 |
| WO | WO 99/43146 | 8/1999 |
| WO | WO 00/10078 A2 | 2/2000 |
| WO | WO 02/41684 A2 | 5/2002 |

* cited by examiner

*Primary Examiner*—David R. Hudspeth
*Assistant Examiner*—Brian L Albertalli
(74) *Attorney, Agent, or Firm*—Greenberg Traurig, LLP; James J. DeCarlo (57) ABSTRACT

An online communications system for converting language. The language conversion is achieved by first storing words and phrases corresponding to a language key and a unique key value in a table at both the transmit and receive ends of the communication. The computer located at the transmit end receives and converts the word or phrase into the unique key value and transmits the unique key value to the computer at the receiving end. The computer at the receiving end receives and converts the unique key value into the corresponding word or phrase.

32 Claims, 7 Drawing Sheets

| key value | int. code | string |
|---|---|---|
| I00013 | us | You may not lead a heart until hearts are broken. |
| I00013 | fr | Vous ne pouvez pas poser de coeur jusqu'à ce que quelqu'un ait ouvert à coeur. |
| I00013 | es | No puede jugar un corazón si alguien no ha jugado otro corazón. |
| I00013 | de | Sie können erst dann Herz ausspielen, wenn Herz schon einmal gespielt wurde. |
| I00015 | us | The outcome of the hand is still in doubt. |
| I00015 | fr | Le résultat du jeu est toujours aléatoire. |
| I00015 | es | Es La mano aún no está decidida. |
| I00015 | de | De Das Ergebnis der Hand ist immer noch fraglich. |
| I00016 | us | You must lead the two of clubs. |
| I00016 | fr | Vous devez poser le deux de trèfle. |
| I00016 | es | Debe jugar el dos de tréboles. |
| I00016 | de | Sie müssen die Pik 2 ausspielen. |
| I00027 | us | Shot the moon.\n |
| I00027 | fr | A fait un déménagement à la cloche de bois.\n |
| I00027 | es | Ha alcanzado la luna.\n |
| I00027 | de | De hat sich davongemacht.\n |
| I00038 | us | Click three cards and then click 'Pass' |
| I00038 | fr | Cliquez sur trois cartes, puis sur Passer |
| I00038 | es | Haz clic en tres cartas y después en 'Pasar' |
| I00038 | de | Klicken Sie auf drei Karten und dann auf 'Passen' |
| I00039 | us | Has claimed the remaining points. |
| I00039 | fr | A réclamé les points restants. |
| I00039 | es | Ha reclamado los puntos restantes. |
| I00039 | de | Wurden die übrigen Punkte gutgeschrieben. |
| I00042 | us | Final score. |
| I00042 | fr | Score final. |
| I00042 | es | Puntuación final. |
| I00042 | de | Final score. |
| I00047 | us | You must pass exactly three cards. |
| I00047 | fr | Vous devez passer exactement trois cartes. |
| I00047 | es | Debe seleccionar tres cartas. |
| I00047 | de | Sie müssen genau drei Karten passen/weitergeben |
| I00050 | us | Game Over. |
| I00050 | fr | Partie terminée. |
| I00050 | es | Fin de partida. |
| I00050 | de | Spiel beendet. |
| I00064 | us | Options for Hearts table. |
| I00064 | fr | Options pour la table de Dame de pique. |
| I00064 | es | Opciones para Corazones. |
| I00064 | de | Optionen für Hearts-Tisch. |

Table A

| key value | int. code | string |
|---|---|---|
| I00013 | us | You may not lead a heart until hearts are broken. |
| I00015 | us | The outcome of the hand is still in doubt. |
| I00016 | us | You must lead the two of clubs. |
| I00027 | us | Shot the moon. |
| I00038 | us | Click three cards and then click 'Pass'. |
| I00039 | us | Has claimed the remaining points. |
| I00043 | us | NO PASS. |
| I00047 | us | You must pass exactly three cards. |
| I00050 | us | Game over. |
| I00064 | us | Options for Hearts table. |

Table B

MULTI-LANGUAGE SYSTEM FOR ONLINE COMMUNICATIONS

BACKGROUND OF THE INVENTION

This invention relates to the field of online communications and more particularly, to a system and method for facilitating communications between two or more individuals in multiple languages.

SUMMARY OF THE INVENTION

The Internet is a global communications network linking users (actually linking their computers) from every continent and every country around the world. Computers, unlike humans, communicate with one another using standards-based communications protocols like Transmission Control Protocol/Internet Protocol (TCP/IP). E-mail, for example, is sent from the user's computers to mail servers and back again to user's computers using the Simple Mail Transfer Protocol (SMTP). Technically, the Internet works seamlessly because all the computers and servers "talk" the same the "language."

However, unlike computers, for the humans who live, work and even play on the Internet, there is no universal language. Nor is any one language a default language for Internet users. On the Internet there is a language barrier. Further, both Cultural and educational challenges make it unlikely that any universal language for Internet users will be adopted; despite the fact that having no universal language is the single most inhibiting factor slowing the effectiveness of the Internet for collaboration among users of dissimilar languages.

As is often the case with many forms of new technology, new ideas emerge to lessen problems and aid its broader use. One such solution to the Internet language barrier is language translation software (both in the form of stand alone software, and its Internet implementation on language translation web sites), which allow users to input text in one language and receive a translation in a second language. However, translation software is lacking because it requires users to first access a different application or visit a web site; and second, it requires users retype or copy and paste the translation to send a message. Additionally, translation software and web sites often use "general" translation tables and often fail to correctly translate esoteric words and phrases specific to certain specialized topics. This limitation greatly limits their effectiveness for Internet-based applications due to the specialized nature and meaning of words and phrases.

One Internet application where users benefit by communicating in their native language is multi-player online interactive games. During multi-player online interactive games players often hail from all points of the globe, and speak in many different languages. The dissimilar languages of the players often reduces, or eliminates altogether, interaction between players. Ultimately this dampens the multi-player experience because users cannot interact with each other.

Another Internet application where users benefit by communicating in their native language is collaborative project development efforts, such as computer software programming. One such effort, the development of the Linux open-source operating system, was such a collaborative effort which involved thousands of programers from around the world. This effort was undertaken in several primarily languages, including English and Finnish. However, many of the programers who didn't speak either language were at a severe disadvantage.

BRIEF DESCRIPTION OF THE DRAWINGS

Table A. depicts a sample server language conversion lookup table.

Table B. depicts a sample client language conversion lookup table.

DETAILED DESCRIPTION OF THE INVENTION

In the following embodiments of the invention, common reference numerals are used to represent the same components. If the features of an embodiment are incorporated into a single system, these components can be shared and perform all the functions of the described embodiments.

The preferred embodiment of the present invention operates on the Internet, and more specifically, on the World Wide Web using software applets. The software implementation environment provided by the World Wide Web is described in a number of books, including John December & Mark Ginsburg, HTML 3.2 and CGI Unleashed (1996), which is hereby incorporated by reference. The World Wide Web is based on the Hypertext Transfer Protocol (HTTP), which is described in *Hypertext Transfer Protocol—HTTP/*1.0, T. Berners-Lee et al., Internet Request for Comments No. 1945, (1996), which is hereby incorporated by reference. The HTTP protocol uses a general connection-oriented protocol such as the Transmission Control Protocol/Internet Protocol (TCP/IP), which is described in *Internetworking with TCP/IP* 3d. ed., Douglas E. Comer, (1995), which is hereby incorporated by reference. However, the present invention is not limited to HTTP, nor to its user of TCP/IP or any other particular network architecture, software or hardware which may be described herein. The principles of the invention apply to other communications protocols, network architectures, hardware and software which may come to compete with or even supplant the state of the art at the time of the invention.

Figure 1:
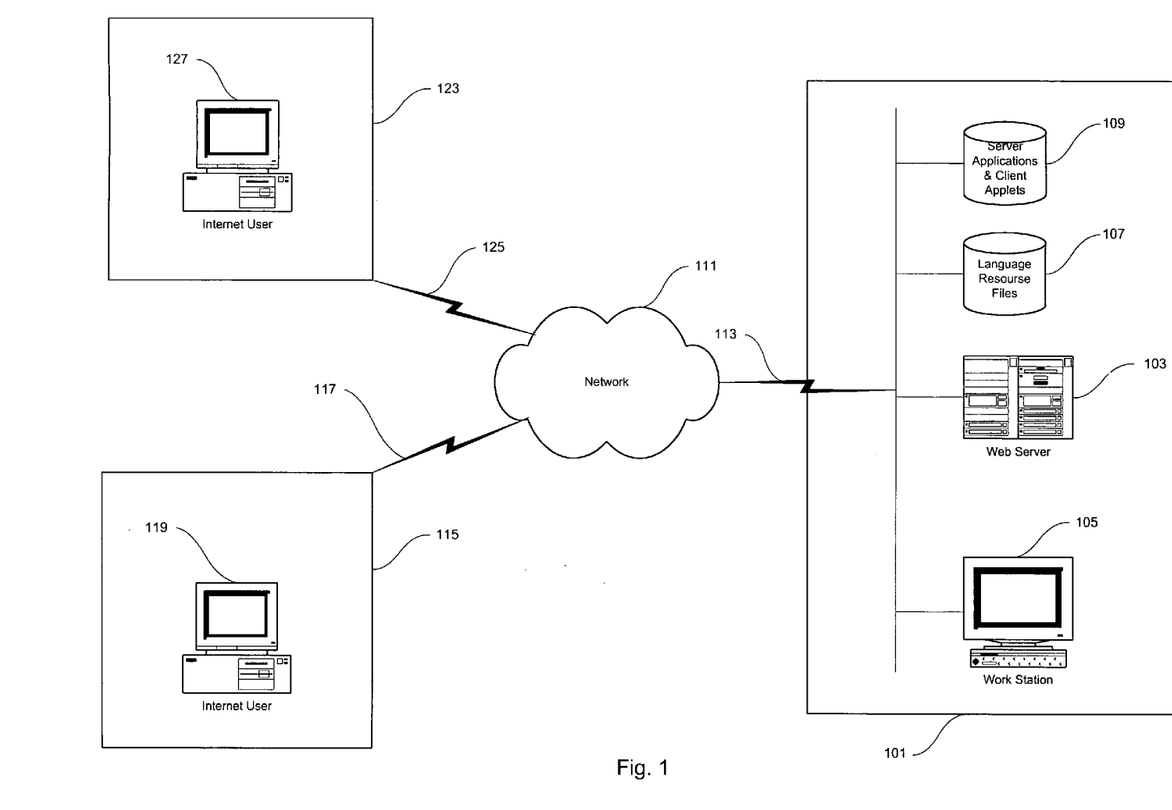
FIG. 1. details the overall architecture of the system.

FIG. 1 shows a typical network environment for interactive online communications. Typically, the network 111 is the Internet, a global computer network. An Internet user 119 connects via a communications link 117 to the Internet 111. Once connected to the Internet 111, the Internet user 119 can communicate with one or more web servers 103 which are connected to the Internet via a communications link 113. Additionally, other Internet users 127 connected to the Internet 111 via a communications link 125, may also communicate with one or more web servers 103. Because the Internet is a global communications network it allows both users and servers to be physically located at differently locations anywhere around the world. For example, location 123 could be in San Francisco, location 115 in Los Angeles and location 101 in Boston.

Figure 2:
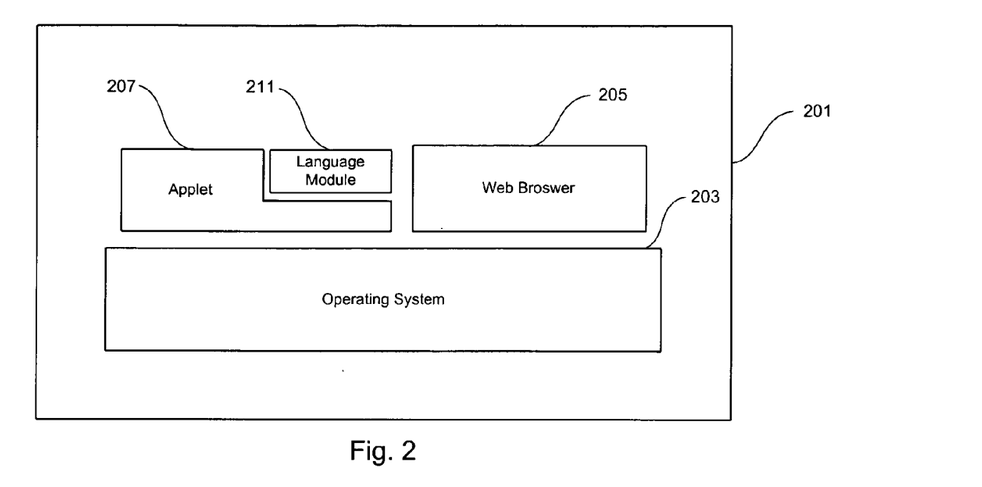
FIG. 2. details the server-side software architecture of the system.

FIG. 2 describes a typical user's computer 201 software. The computer 201 runs an operating system 203 such as Windows from Microsoft, Unix, or the like. Additionally, the user's computer 201 also executes a computer program called a Web browser (browser) 205. The browser sends out HTTP requests to one or more Web servers 103. In the requests, particular items of data, referred to as resources, which are available on servers, are referred to by means of uniform resource locators (URL's). URLs are text strings in a defined format described in Berners-Lee et al., supra. A URL includes both an identification of the server and an identification of a particular item of data within the server. Responsive to the user's request, the server(s) return responses to the user's browser, and the browser 205 acts upon those responses, generally by displaying the requested content to the user.

The content portion of the responses can be a "Web page," expressed in hypertext markup language (HTML). HTML can also include instructions to the browser to display bitmap-format images and other URL links (also known as anchors and hyperlinks) interspersed within the web page. The responses can also include more complex commands to be interpreted by the browser (i.e., commands which result in an execution of a script). HTML itself does not define complex commands, rather they are considered to belong to separately-defined scripting languages. One common scripting language is JavaScript, which is further defined in *Javascript: The Definitive Guide*, David Flanagan, (1998), which is hereby incorporated by reference.

In addition to executing scripts it is also possible to extend the function of a browser with compiled code. One method to extend the functionality of a browser is by use of compiled code to assist the browser in performing additional functions, typically enabling in-line display of content by the browser. This "helper" code is referred to as a "plug-in," typically includes additional function libraries and additional file format support for various graphics files.

Another more powerful method used to extend the functionality of the browser is by means of using compiled code which executes as a stand-alone application. Such compiled code is typically referred to as an "applet." While applets are stand-alone applications, they sometimes utilize the display functionality inherent within the browser to display their output. Applets may also be executed with any interaction with a web browser.

Applets 207 are typically stored on a mass storage device 109 and downloaded from the web server 103 over the network 111 to the user's computer 201 by the web browser 205. Once downloaded, the applet runs on the user's computer 201 and provides additional features and operations not otherwise available.

Figure 3:
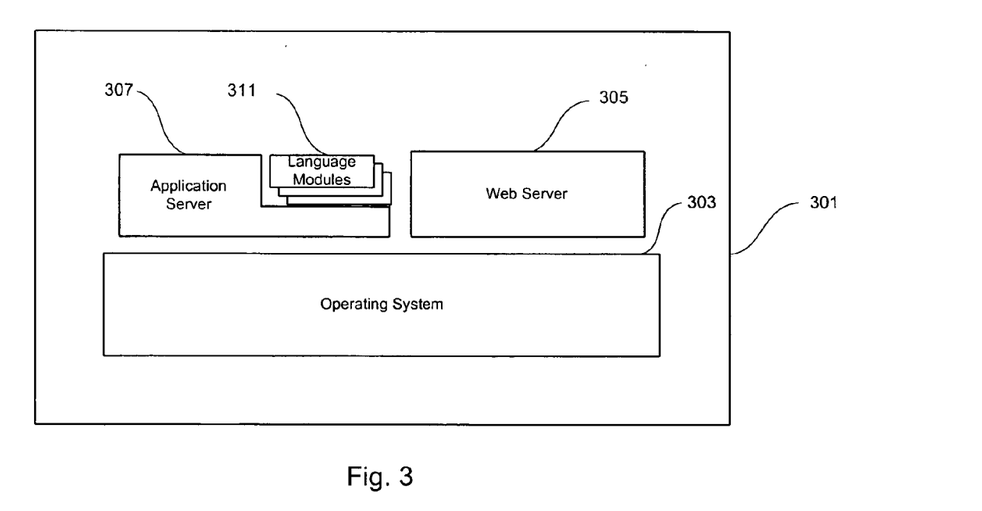
FIG. 3. details the client-side software architecture of the system.

FIG. 3 depicts a typical server 301 software. The server 301 runs an operating system 303 such as Microsoft NT Server (Microsoft and NT are trademarks of Microsoft Corporation) or Unix or the like. Additionally, the server 301 also executes web server software 305 such as Apache (Apache is open-source web server software, whose development is overseen by the Apache Software Foundation). The server responds to user's HTTP requests with particular items of data, referred to as resources, which are available on the server 301. Additionally, the server may also execute task-specific server side applications 307. These applications interact directly with user applets 207, providing content and servicing the task-specific requests from user a server side application 307 runs directly atop the operating system software 303. Direct communication between the server side application and user applets occurs using a communications path, such as TCP/IP, which is handled by the operating system 303 and its network daemon. As is well known in the art, the server functions, including web server and applications server functions, may be distributed to multiple machines, or performed on a single machine, in any combination.

In FIG. 2, the language module 211 contains language information which the applet uses to interface with the user in their desired language. The language modules are either complied into the applet or, in another embodiment, is a database file or DLL file. The latter embodiments provide for realtime updates to the language file without recompiling or downloading a new applet.

In FIG. 3, the language modules 311 contain language information which the server side application uses to interface with users in their desired language. The language modules are either complied into the server side application or, in another embodiment, is a database file or DLL file. Additionally, server side language modules can be segmented or organized into several files, or cached in the server's memory.

The user's language module file 211 provides all needed language (words and phrases) to the server side applet 207. In FIG. 3, a server's language module 311 provides all needed language (words and phrases) to the application 307. A sample text-based server language module is shown in appendix A. A sample text-based user language module is shown in appendix B. In the preferred embodiment, the server's language module file contains words and phrases in multiple languages, whereas the user's language module file contains only a subset of words and phrases in one language. In another embodiment, both the server's language module file contains words and the user's language module contains words and phrases in multiple languages. In yet another embodiment, the server's language module file contains words and phrases in multiple languages, whereas the user's language module file contains only a subset of words and phrases in multiple languages. Many other embodiments exist where the data contained in the language module files on the server and on the user side are sets and subsets of the other. As is well known in the art, this design approach allows for tailoring the size and content of the language module files to meet the needs of the application. Additionally, either file may be stored in binary or text based file format, and in one or many data files.

As shown in Tables A and B, each language modules file is a table containing sets of 3 corresponding values. A key value, corresponding international country codes, and corresponding strings of text. The key values are unique integers which allow the identification of a phrase or word, without respect to any specific language. Put another way, a key value identifies a phrase or word in every language. Further, each a key value represents only one single meaning. For example, the phrase "cool" has several meanings in English. First, its literal meaning relating to temperature; second, a slang, loosely meaning "good;" a second slang, loosely used to describe a person who is unflappable or composed; and yet another slang describing someone who is not friendly. These meaning, however, do not translate literally in the United Kingdom. Therefore, by assigning only one key value to each meaning, the correct meaning can be related in every country.

The corresponding international country code identifies the language of the particular string of text, either a word or phrase. These codes often take the form of: "us" for the United States, "es" for Spain, "fr" for France, "de" for Germany, etc. These codes are maintained by ISO 3166 Maintenance Agency (ISO 3166/MA), and the authoritative list is kept under publication ISO 3166-1. Additionally, other codes not approved by the ISO Maintenance Agency can be created for locations without a code, or to support countries with more then one language or dialect. In another embodiment of the invention, entire sets of unique codes can be created to further categorize the available languages.

The corresponding strings of text are words or phrases. A different string can exist for each corresponding country code allowing the present invention to translate each occurrence of a word or phrase to its meaning in every language. Further, as each a key value represents only a single meaning, errors in translations from one language to another are completely eliminated.

FIG. 1 depicts Internet users and servers which situated at three different locations (namely, 101, 115, and 123). Of course, if the network 111 is a global communications network, such as the Internet, then the users and servers may be located around the world; each may use a multitude of languages. The web server 103 may be programmed using a programming workstation 105, to interact with users in a multitude of languages. The web server 103 may also employ one or more methods to determine in which language it will use to interact with a given user.

The web server 103 may be programmed to use a default language such as English allow the user to select the desired language from a list. Additionally, the web server 103 may determine which language should be used. One method to determine which language should be used is to use the language of the web server where the user was visiting just prior to visiting the current web server. Often, web browsers report the Uniform Resource Locator (URL) of the server users are coming from to the new server. Using this information and a table of other web server's default language, the new web server may be able to determine which language should be used with a user. For example, if the Internet user is redirected to the web server 103 by a web site which is known to be a French language web site the web server may determine that French is the user's preferred language.

Another method used to determine the proper language of users is by setting a "cookie" (a small data file stored on the user's computer which stores certain data, such as a default language). In the instant embodiment, the user is prompted to select a language and this is selection is stored in an "cookie." "Cookies" are typically set by a server the first time a user visits the server and are only readable by that server. Once this "cookie" is stored on the user's computer, the web server can determine which language the user prefers each time the user visits again. Additional methods include using an applet or plugin to query the user's operating system registry database.

Once the web server 103 has determined the appropriate language it may then display web pages and content in the appropriate language. Additionally, once the web server 103 has determined the appropriate language, a user's request for an applet can be serviced by providing an applet pre-compiled with regional language module that corresponds to the user's desired language, or by serving the proper language resource file for use by the applet.

The following example details one embodiment of the invention. More specifically, the example details an application of the invention for interactive online computer gaming. The invention is well suited for this application because many users of interactive online computer games come from many different areas around the world. Because users prefer to interact with the online game environment in their native language the system must support and use many different languages.

The user turns on their computer to 202 and loads the computers operating system 203. Next, the user executes a web browser 205 and begins communications with one or more Internet web servers. The user then instructs their web browser 205 to access the online interactive game providers web server 103. Specifically, the user navigates to the providers online game area and initiates the sequence to play an online game by clicking on an appropriate HTML link corresponding the online game they wish to play. In this example, the user will choose to play the popular card game "Hearts".

Figure 4:
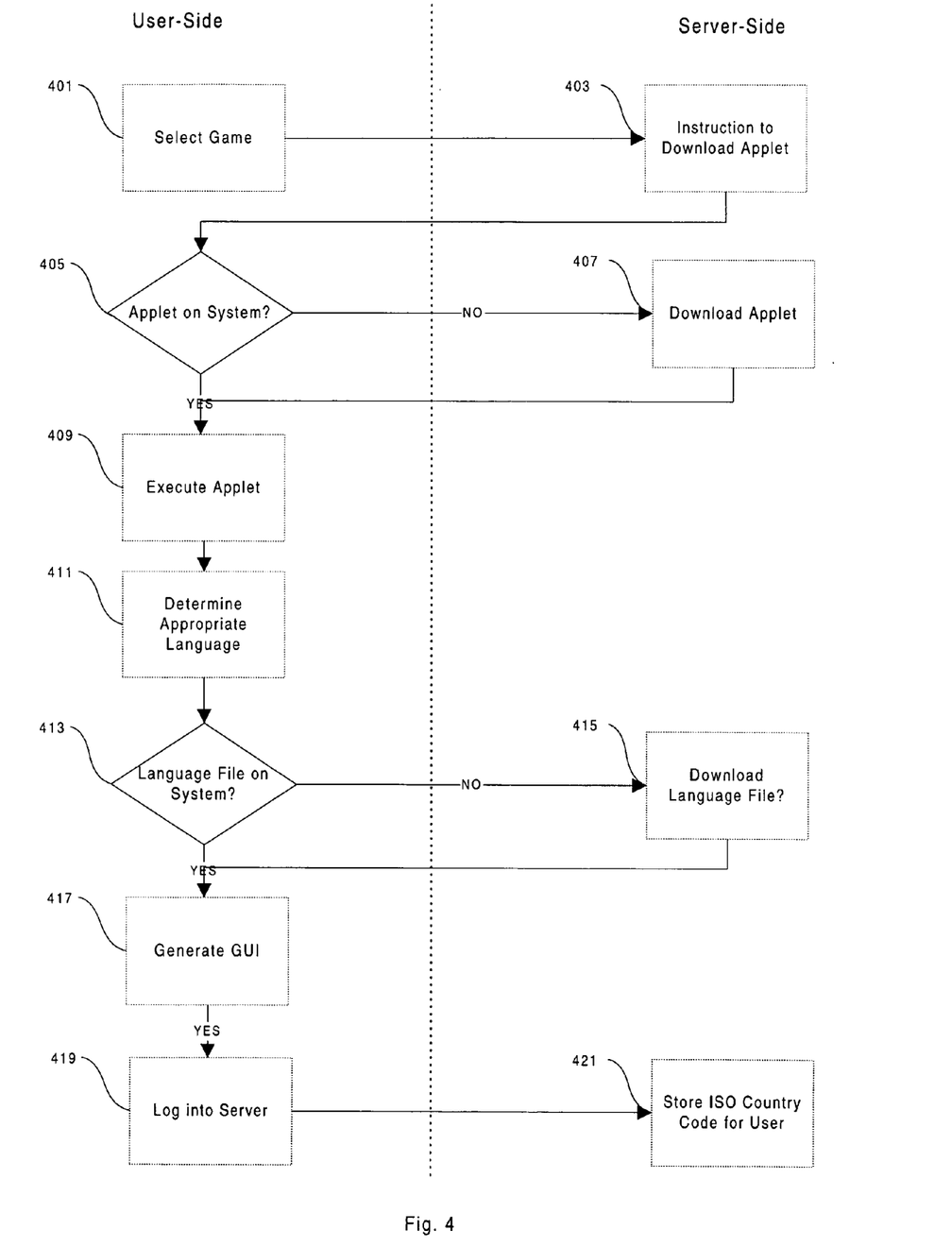
FIG. 4. depicts a sample language resource file.

In block 401, the user selects the game "Hearts" and then in block 403 the web server 305 sends the browser 205 an instruction to download the "Hearts" game applet for execution on the user's PC. The user's browser 205, having received the URL and instruction from the web server 305 to download the applet, first checks to see if the applet has already been downloaded to the user's computer. In block 405, if the applet has been downloaded previously and is stored on the user's computer, the browser 205 may check to see whether or not the stored applet has the same date and revision as the applet the server suggested the browser 205 download. If the user has already downloaded the applet and it is stored on the hard drive, then in block 409 the applet is executed by the user's computer 201. If the user has not downloaded the applet then in block 407 the browser follows the URL and retrieves or downloads the applet. Then in block 409 the browser or applet user executes the 207.

Once the applet is 207 executed the applet runs as a stand alone application on the users's computer. During the 201 applet's initialization process the applet 207 performs several steps. First, in block 411 the applet 207 determines the appropriate language for the user, using one or more of the methods discussed above. Second, in block 413 the applet 207 queries whether or not the appropriate language resource module file 211 is stored on the users computer 201. If the language resource module file 211 is not stored on the local computer 207, in block 415 the applet initiates communication with the application server 300 and downloads the appropriate language resource module file 311. Third, in block 417 the applet generates its user interface (this is often a graphical user interface or GUI). The GUI is constructed using the language specific information contained within the language resource module file 211. Accordingly, all of the dialog, application menus, and command and interactivity between the applet 207 and the user is done in the appropriate language. Fourth, in block 419 the applet initiates a log-in sequence with the application server, 307 prompting the user were necessary to supply a user name and/or password. Additionally, in block 421 during the log-in sequence the applet 207 communicates to the application server 307, the appropriate ISO country code thereby designating the user's selected language.

After the applet 207 has concluded its start-up procedures and logged into the application server 307 the applet 207 begins interacting with the user in the appropriate language. The application server 307 communicates to the applet 207 which displays to the user, a list of available players with whom the user may interact. Specifically, in this example, the Internet user, 119, may play the card game of "Hearts" with one or more other Internet users 127. After the required number of users (e.g., 119, 127, etc.) have been selected, the application server 307 instructs the users applets 207 to begin the game. Throughout the course of the game each user's applet 207 interacts directly with the application server 307 and displays the state of the game to the users on their display. Additionally, the applet 207 passes necessary commands made by a user directly to the application server 307.

Figure 5:
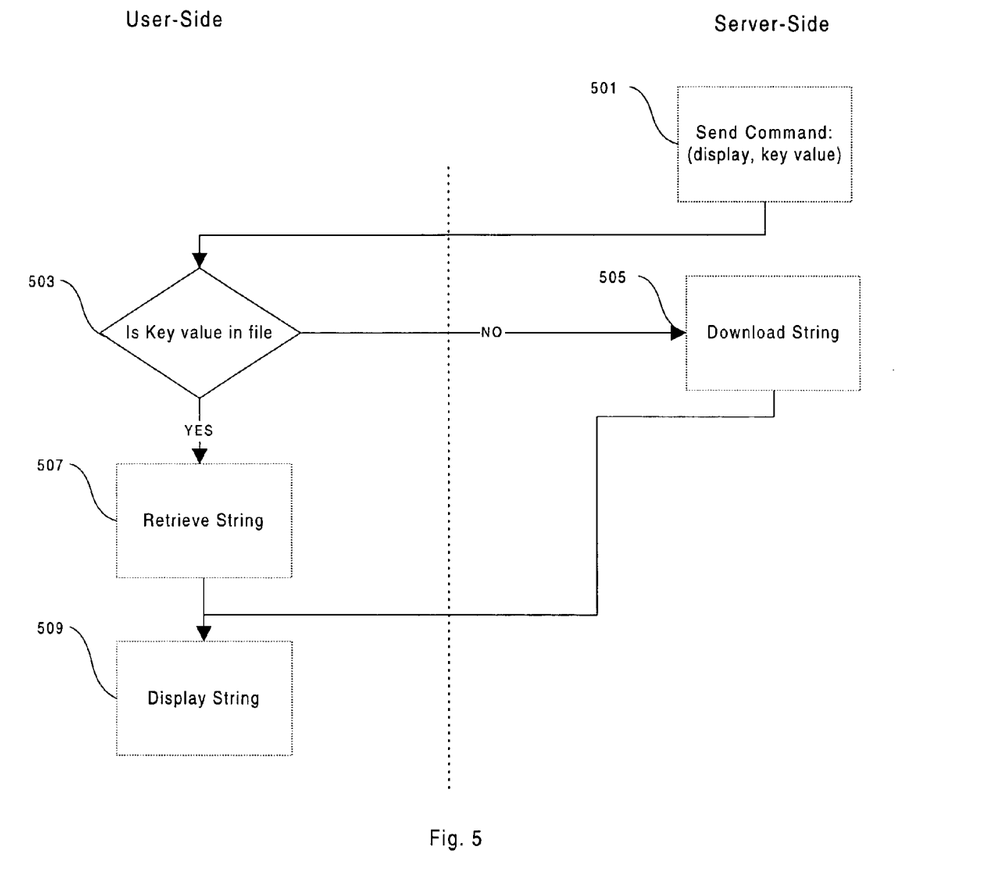
FIG. 5 depicts an embodiment for transmitting a command and a key value for an appropriate message communication.

During the course of the game the application server 307 may initiate communication directly with each user. Each communication is embedded with a command from the application server 307 to the applet 207. This communication includes a command instructing the applet 207, that the application server 307 wishes the applet 207 to display a message to the user. The command is followed by the key value for the appropriate message. For example, at the start of the game it is appropriate for each user to select three cards to pass to the player on their right. Accordingly, at the start of the game, in block 501 the application server 307 sends the command to display a message followed by the key value corresponding to that message as shown in Table A to each user. In this case, the appropriate key value is I00001. Accordingly, in block 503 each applet 207 will look up the key value in their language resource file 211. If the key value is not in the language resource file, in block 505 the applet will request the string from the application server 307. In block 507 if the key value is in it the language resource file the applet will retrieve the string corresponding key value I00001 from the file. Next, in block 509 the applet will display the string.

In addition, the server may communicate to the users a message whose string is not stored in the language resource module file. In this situation the application server transmits a command notifying the applet 207 to display the string which follows. This transmission concludes with a traditional End Of Line (EOL) character notifying the applet 207 of the end of this string.

Figure 6:
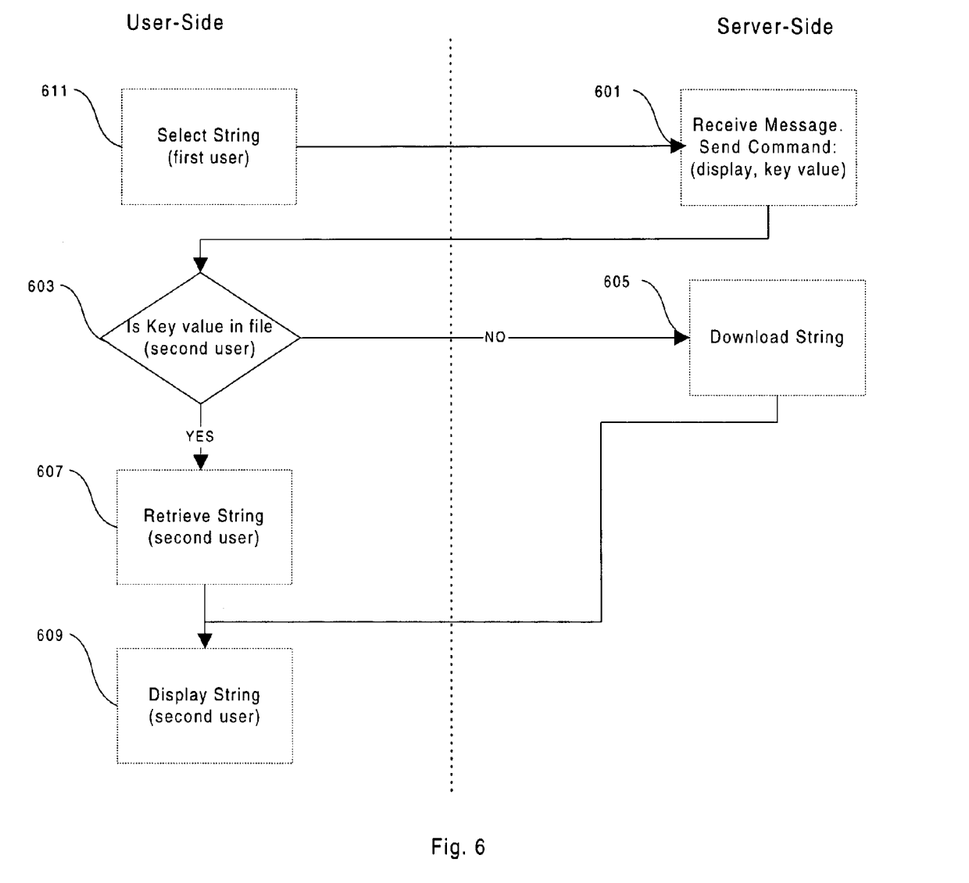
FIG. 6 depicts an embodiment for displaying a message in an appropriate language.

Similar to the communication originated by the application server 307 destined for the user, users may initiate communication as well. For example, one Internet user 119 wishes to compliment a second Internet user, 127 on an excellent move. Accordingly, in block 611 a first user would select from a drop down box the message the user chooses to send to a second user. The user's applet 207 would generate a message to the server that this message should be passed on to a specific user and transmit the message to the server. Much like the manner in which the application server 307 communicates to the user, this message from the applet would contain the appropriate key value. As shown in Table A the corresponding key value for such a message is I000027 which correlates to the text string "Shot the moon." In identical fashion, as a message received from the server, the user's applet for the Internet user receiving the message would display the appropriate string of text in the appropriate language.

Accordingly, in block 601 the application server 307 sends the command to the second user to display a message followed by the key value corresponding to that message as shown in Table A on the second users computer. In block 603 the second user's applet 207 will look up the key value in the language resource file 211. If the key value is not in the language resource file, in block 605 the applet will request the string from the application server 307. In block 607 if the key value is in the language resource file the applet will retrieve the string corresponding key value I000027 from the file. Next, in block 509 the applet will display the string.

In some situations it may be advantageous not to store all or some of the language resource files at the user side. Accordingly, one embodiment of the invention allows the server to supply many, or even all, of the strings to the user. Thus, the language resource file at the user side is reduced to a subset of the typical language resource file. In this embodiment the server stores a list of which strings the language resource files contains, and then transmits the needed strings directly to the applet. In another embodiment with a reduced language resource file, the server may not keep record, but instead, first transmit the key value. If the applet does not have the key value stored it can reply to the server requesting it transmit the string. Logic in the applet can decide whether or not to store, or cache this string value for future use.

The following example details a second embodiment of the invention. More specifically, the example details an application of the invention for multi-language online communications between two or more computer programers working on a collaborative project. The invention is well suited for this application because many computer programers come from many different areas around the world. Because programers prefer to interact with each other in their native language the system must support and use many different languages.

The programmer (a.k.a. "user") turns on their computer to 202 and loads the computers operating system 203. Next, the user executes a web browser 205 and begins communications with one or more Internet web servers. The user then instructs their web browser 205 to access the collaborative project web server 103. Specifically, the user navigates to the collaborative project online communications area and initiates the sequence to communicate with another programmer by clicking on an appropriate HTML link corresponding to communicate with the programmer. In this example, the user will choose to communicate with the user "Bob".

When the user selects the game "Bob" the web server 305 sends the browser 205 an instruction to download the communications applet 207 for execution on the user's PC. The user's browser 205, having received the URL and instruction from the web server 305 to download the applet, first checks to see if the applet has already been downloaded to the user's computer. If the applet has been downloaded previously and is stored on the user's computer, the browser 205 may check to see whether or not the stored applet has the same date and revision as the applet the server suggested the browser 205 download. If the user has already downloaded the applet and it is stored on the hard drive, then the applet is executed by the user's computer 201. If the user has not downloaded the applet then the browser follows the URL and retrieves or downloads the applet. Then the browser or applet user executes the 207.

Once the applet is 207 executed the applet runs as a stand alone application on the users's computer. The applet is used to facilitate interactive communication between the programers. During the 201 applet's initialization process the applet 207 performs several steps. First, the applet 207 determines the appropriate language for the user, using one or more of the methods discussed above. Second, the applet 207 queries whether or not the appropriate language resource module file 211 is stored on the users computer 201. If the language resource module file 211 is not stored on the local computer 207, the applet initiates communication with the application server 300 and requests the appropriate language resource module file 311. Third, the applet generates its user interface (this is often a graphical user interface or GUI). The GUI is constructed using the language specific information contained within the language resource module file 211. Accordingly, all of the dialog, application menus, and command and interactivity between the applet 207 and the user is done in the appropriate language. Fourth, the applet initiates a log-in sequence with the application server, 307 prompting the programmer were necessary to supply a user name and/or password. Additionally, during the log-in sequence the applet 207 communicates to the application server 307, the appropriate ISO country code thereby designating the user's selected language.

After the applet 207 has concluded its start-up procedures and logged into the application server 307 the applet 207 begins interacting with the user in the appropriate language. The application server 307 communicates to the applet 207 which displays to the user, a list of available programers with whom the user may communicate. Specifically, in this example, the Internet user 119, may communicate with "Bob" or with one or more other Internet users 127. Throughout the course of the communication each user's applet 207 interacts directly with the application server 307 and displays the communications of the other programers on the their displays. Additionally, the applet 207 passes necessary commands made by a user directly to the application server 307.

During the course of the communication the application server 307 may initiate communication directly with each programmer. Each communication is embedded with a command from the application server 307 to the applet 207. This communication includes a command instructing the applet 207, that the application server 307 wishes the applet 207 to display a message to the user. The command is followed by the key value for the appropriate message. For example, a programmer may has closed their connection with the communications server their right. Accordingly, the application server 307 sends the command to display a message followed by the key value corresponding to a message to the programmer. In this case, the appropriate key value would have a corresponding string such as, "programmer "Bob" has closed their connection with the communications server." Accordingly, each applet 207 will display the string for the corresponding key value to their user in the proper language. Additionally, the server may communicate to the users a message whose string is not stored in the language resource module file. In this situation the application server transmits a different command notifying the applet 207 to display the text which follows. This transmission concludes with a traditional End Of Line (EOL) character notifying the applet 207 of the end of this string.

Similar to the communication originated by the application server 307 destined for a programmer, programmers may initiate communication as well. For example, if one Internet user 119 wishes to send a message to another Internet user, 127 asking a question Internet user 119 would select from a drop down box the message containing the appropriate question. The user's applet 207 would generate a message to the server that this message should be passed on to a specific user. Much like the manner in which the application server 307 communicates to the user, this message from the applet would contain the appropriate key value which correlates to the text string of the question. In identical fashion, as a message received from the server, the user's applet for the Internet user receiving the message would display the appropriate string of text in the appropriate language.

In some situations it may be advantageous not to store all or some of the language resource files at the user side. Accordingly, one embodiment of the invention allows the server to supply many, or even all, of the strings to the user. Thus, the language resource file at the user side is reduced to a subset of the typical language resource file. In this embodiment the server stores a list of which strings the language resource files contains, and then transmits the needed strings directly to the applet. In another embodiment with a reduced language resource file, the server may not keep record, but instead, first transmit the key value. If the applet does not have the key value stored it can reply to the server requesting it transmit the string. Logic in the applet can decide whether or not to store, or cache this string value for future use.

In a similar application, namely multi-language online communications between two or more computer programmers working on a collaborative project, the server function can be run on each users' computer. This can be achieved by either incorporating the functions into each applet, or by executing a stand alone application server on each computer. Accordingly, using this method, the invention provides for multi-language online communications between two or more computer users without the need of a dedicated server. Coordination of language resource files can be achieved by use of a web server, however, this server need not be interactively involved in the multi-language online communications.

In the instant embodiment, language resource files stored on the client may contain more then one language (i.e., strings that correlate to more then one country code). The additional languages can be used to send directly to others users.

In another embodiment server interaction may be removed once the applets have received the needed language resource files and initiated communications. For example, after the applets have determined the address and language resource files needed to communicate, message need not be routed to the server for delivery.

The invention claimed is:

1. A system comprising:
   a communications network connecting at least one of a plurality of network servers and at least one of a plurality of computers:
   wherein at least one of the plurality of computers comprises a conversion table, the conversion lookup table comprising;
   a unique key value for each of a plurality of unique words or phrases;
   a language key for at least one language; and
   a plurality of text phrases each corresponding to a language key and a unique key value; and
   wherein the at least one of the plurality of computers is further programmed:
   to receive a selection of a word or phrase;
   to convert the word or phrase into a unique key value using the conversion table; and
   to transmit the unique key value to the network server.

2. The system of claim 1, wherein the conversion table comprises language keys and text phrases for more than one language.

3. The system of claim 1, wherein the conversion table comprises text phrases for only one language key.

4. The system of claim 1, wherein the network server is programmed to receive the unique key value from the computer and transmit the unique key value to a second of the at least one of the computers.

5. The system of claim 4, wherein the second computer further comprises a second conversion table, the second conversion table comprising:
   a unique key value for each of a plurality of unique words or phrases; a language key for at least one language; and
   a plurality of text phrases each corresponding to a language key and a unique key value.

6. The system of claim 5, wherein the second computer is programmed to receive a unique key value from the network server and convert the unique key value into a word or phrase using the second conversion table.

7. The system of claim 5 wherein the second conversion table comprises language keys and text phrases for more than one language.

8. The system of claim 5 second conversion table comprises text phrases for only one language.

9. The system of claim 5, where the conversion table contains a proper subset of the information contained within a server conversion table.

10. The system of claim 9 wherein the second conversion table contains a proper subset of the information contained within the server conversion table.

11. The system of claim 10 wherein the second conversion table contains less than all the language contained within the server conversion table.

12. The system of claim 5, where the conversion table contains less than all the languages contained within a server conversion table.

13. The system of claim 1, wherein the network server further comprises a server conversion table, the server conversion table comprising:

a unique key value for each of a plurality of unique words or phrases;
a language key for at least one language; and
a plurality of text phrases each corresponding to a language key and a unique key value.

14. The system of claim 13 wherein the network server is programmed to receive the unique key value from the computer, convert the unique key value into a word or phrase using the server conversion table and transmit the word or phrase to a second one of the at least a plurality of computers.

15. The system of claim 14 wherein the conversion table comprises language keys and text phrases for more than one language.

16. The system of claim 14 wherein the conversion table further comprises text phrases for only one language.

17. The system of claim 13, where the conversion table contains a proper subset of the information contained within the server conversion table.

18. The system of claim 13, where the conversion table contains less than all the languages contained within the server conversion table.

19. A system comprising:
a communications network connecting at least one of a plurality of network servers and at least one of a plurality of computers;
wherein at least one of the plurality of network servers comprises a server conversion table, the server conversion table comprising:
a unique key value for each of a plurality of unique words or phrases;
a language key for at least one language; and
a plurality of text phrases each corresponding to a language key and a unique key value;
wherein the network server is programmed to receive a word or phrase from one of the at least one of a plurality of computers and convert the word or phrase using the server conversion table; and
wherein the network server is programmed to transmit a unique key value to a second of the at least one of a plurality of computers.

20. The system of claim 19 wherein the conversion table comprises language keys and text phrases for more than one language.

21. The system of claim 19 wherein the conversion table comprises text phrases for only one language.

22. The system of claim 19, wherein the second computer comprises:
a conversion table, the conversion table comprising:
a unique key value for each of a plurality of unique words or phrases;
a language key for at least one language; and
a plurality of text phrases each corresponding to a language key and a unique key value; and
wherein the second computer is programmed to receive the unique key value from the network server and convert the unique key value into a word or phrase using the conversion table.

23. The system of claim 19, wherein the network server is programmed to convert the unique key value into a phrase corresponding to a language key for a second of the at least one of a plurality of computers using the server conversion table and transmit the phrase to a second computer.

24. The system of claim 19, wherein the server conversion table comprises language keys and text phrases for more than one language.

25. In a communications network connecting at least one of a plurality of network servers and at least one of a plurality of computers, wherein one of the at least one of a plurality of computers is comprised of a conversion table, the conversion table comprising:
a unique key value for each of a plurality of unique words or phrases;
a language key for at least one language; and
a plurality of text phrases each corresponding to a language key and a unique key value;
wherein the one computer is programmed:
to receive a selection of a phrase;
to convert the phrase into a unique key value using the conversion table; and
convert the unique key value into a phrase according to a language key using the conversion table.

26. The system of claim 25 wherein the conversion table comprises language keys and text phrases for more than one language.

27. In a communications network connecting network servers comprising a server conversion table, the server conversion table having a plurality of words or phrases corresponding to a language key and a unique key value, and at least one of a plurality of computers each comprising a conversion table, the conversion table having a plurality of words or phrases corresponding to a language key and a unique key value; the method of converting language comprising the steps of:
a first of the plurality of the computers receiving a selection of a word or phrase; the first computer looking up the unique key value stored in the conversion table corresponding to the received word or phrase;
the first computer transmitting the unique key value to the network server; the network server transmitting a unique key value to a second computer;
a second of the plurality of the computers receiving the unique key value from the network server;
the second computer looking up a converted word or phrase in the conversion table corresponding to the received unique key value and a language key; and
the second computer displaying the word or phrase.

28. In a communications network connecting at least one of a plurality of network servers each comprising a server conversion table, the server conversion table having a plurality of words or phrases corresponding to a language key and a unique key value; and at least one of a plurality of computers each comprising a conversion table, the conversion table having a plurality of words or phrases corresponding to a language key and a unique key value;
the method of converting language comprising the steps of:
the network server receiving a selection of a word or phrase;
the network server looking up the unique key value stored in the server conversion table corresponding to the received word or phrase;
the network server transmitting the unique key value to a computer;
the computer receiving the unique key value from the network server;
the computer looking up a converted word or phrase in the conversion table corresponding to the received unique key value and a language key; and
the computer displaying the converted word or phrase.

29. In a communications network connecting at least one of a plurality of computers each comprising a conversion table, the conversion table having a plurality of words or phrases corresponding to a language key and a unique key value; the method of converting language comprising the steps of:

the computer receiving a selection of a word or phrase; and the computer looking up the unique key value stored in the conversion table corresponding to the received word or phrase;

the computer transmitting the unique key value to a second computer using the communications network;

the second computer receiving the unique key value from the network server; the second computer looking up a converted word or phrase in the conversion table corresponding to the received unique key value and a language key; and the second computer displaying the converted word or phrase.

30. In a communications network connecting at least one of a plurality of network servers each comprising a server conversion table, the server conversion table having a plurality of words or phrases corresponding to a language key and a unique key value; and at least one of a plurality of computers each comprising a conversion table, the conversion table having a plurality of words or phrases corresponding to a language key and a unique key value;

the method of converting language comprising the steps of:

the computer receiving a selection of a word or phrase;

the computer looking up the unique key value stored in the conversion table corresponding to the received word or phrase;

the computer transmitting the unique key value to the network server;

the network server looking up a converted word or phrase in the server conversion table corresponding to the received unique key value and a language key;

the network server transmitting the converted word or phrase to a second computer; the second computer receiving the converted word or phrase from the network server; and the second computer displaying the converted word or phrase.

31. A system comprising:

a communications network connecting at least one of a plurality of network servers and at least one of a plurality of computers;

wherein at least one of the plurality of computers comprises a conversion table, the conversion table comprising:

a unique key value for each of a plurality of unique words or phrases; and a language key for at least one language; and a plurality of text phrases each corresponding to a language key and a unique key value; and wherein the at least one of the plurality of computers is further programmed:

to receive a selection of a unique key value;

to convert the unique key value into a word or phrase using the conversion table; and to display the converted word or phrase.

32. A system comprising:

a communications network connecting at least one of a plurality of network servers and at least one of a plurality of computers;

wherein at least one of the plurality of computers comprises a conversion table, the conversion table comprising:

a unique key value for each of a plurality of unique words or phrases;

a language key for at least one language; and a plurality of text phrases each corresponding to a language key and a unique key value;

wherein the at least one of the plurality of computers is further programmed:

to receive a selection of a word or phrase;

to convert the word or phrase into a converted word or phrase using the conversion table; and to transmit the converted word or phrase to the network server.

* * * * *